(12) United States Patent
Ince et al.

(10) Patent No.: US 7,210,854 B2
(45) Date of Patent: May 1, 2007

(54) ROLLING-BEARING CAGE

(75) Inventors: Marion J. Ince, Mount Holly, NC (US); Roger L. Ebaugh, Charlotte, NC (US)

(73) Assignee: Ina-Schaeffler KG (DE)

( * ) Notice: Subject to any disclaimer, the term of this patent is extended or adjusted under 35 U.S.C. 154(b) by 510 days.

(21) Appl. No.: 10/613,889

(22) Filed: Jul. 2, 2003

(65) Prior Publication Data

US 2004/0022473 A1 Feb. 5, 2004

Related U.S. Application Data

(60) Provisional application No. 60/394,032, filed on Jul. 2, 2002.

(51) Int. Cl.
*F16C 33/46* (2006.01)

(52) U.S. Cl. .................... 384/575; 384/572; 384/580

(58) Field of Classification Search ............... 384/572, 384/575, 580
See application file for complete search history.

(56) References Cited

U.S. PATENT DOCUMENTS

| | | | |
|---|---|---|---|
| 2,772,128 A | 11/1956 | Schaeffler et al. | |
| 3,251,118 A | 5/1966 | Pitner | 29/148.4 |
| 3,586,406 A * | 6/1971 | Barr | 384/580 |
| 4,003,609 A | 1/1977 | Juhas | 308/217 |
| 4,952,079 A | 8/1990 | Lingner | 384/575 |

FOREIGN PATENT DOCUMENTS

| | | |
|---|---|---|
| DE | 10 09 445 B | 5/1957 |
| DE | 19 03 801 U | 11/1964 |
| DE | 19 52 619 U | 12/1966 |
| DE | 27 12 834 A1 | 10/1977 |
| FR | 13 03 538 | 9/1962 |
| GB | 919 280 | 2/1963 |
| GB | 10 72 626 | 6/1967 |
| GB | 12 11 241 | 11/1970 |
| GB | 14 78 881 | 7/1977 |

OTHER PUBLICATIONS

German Search Report dated Dec. 10, 2003.

* cited by examiner

*Primary Examiner*—William C. Joyce
(74) *Attorney, Agent, or Firm*—Ostrolenk, Faber, Gerb & Soffen, LLP

(57) ABSTRACT

A cage for cylindrical rolling-contact elements, in which two rolling-contact elements that are in contact with one another at their lateral surfaces are arranged in series in the circumferential direction in a pocket and in which each of the two rolling-contact elements is guided parallel to a cage axis, includes a web connecting adjoining side rings to one another, there being stub-shaped webs on the side rings in the center of the pockets, between the two rolling-contact elements, the webs projecting partially into the pocket between the rolling-contact elements. The webs comprise sections that extend parallel to the cage axis, lie partially inside and partially outside the pitch circle and are connected to one another by sections that extend obliquely to the cage axis. The stub-shaped webs have no contact with the rolling-contact elements during rotation of the cage.

7 Claims, 5 Drawing Sheets

ROLLING-BEARING CAGE

CROSS REFERENCE TO RELATED APPLICATION

This application is based upon and claims priority of U.S. Provisional Application Ser. No. 60/394,032, filed Jul. 2, 2002.

AREA OF APPLICATION OF THE INVENTION

The invention relates to a cage for cylindrical rolling-contact elements, especially a needle cage, in which two rolling-contact elements that are in contact with one another at their lateral surfaces are arranged in series in the circumferential direction in a pocket and each of the two is guided parallel to a cage axis by a web connecting adjoining side rings to one another, there being stub-shaped webs on the side rings in the center of the pockets, between the two rolling-contact elements, said webs projecting partially into the pocket, between the rolling-contact elements.

BACKGROUND OF THE INVENTION

A cage of this kind, constructed in accordance with the generic type, is already known from U.S. Pat. No. 2,772,128. FIG. 3 of this prior publication shows a fragment of a cage, in the pockets of which two cylindrical rollers 6, 7 are arranged in series in the circumferential direction, touching one another with their lateral surfaces. They are prevented from falling out of the pockets in the radial direction by retention noses 12, which are arranged on the longitudinal sides of the pockets, opposite one another in the circumferential direction, and lie radially outside and inside the pitch circle. These retention noses 12 interact with stub-shaped webs 13, which are arranged on the side rings 2, 3 of the cage 1 and extend a short way into the pocket.

The disadvantage here is that such a solid cage, which is manufactured from a tube, can be produced only with great difficulty. In order to produce separate inner and outer projections for the retention of the rolling-contact elements, the material must be caulked or deformed accordingly. A further disadvantage is that a cage manufactured in such a solid form is very heavy.

ABSTRACT OF THE INVENTION

It is therefore the object of the invention to develop a cage of the generic type in such a way that it can be produced very easily and has good running properties.

According to the invention, this object is achieved by the fact that the webs comprise sections that extend parallel to the cage axis, lie partially inside and partially outside the pitch circle and are connected to one another by sections that extend obliquely to the cage axis, the connected to one another after it has been bent into a round shape, and the stub-shaped webs having no contact with the rolling-contact elements during rotation of the cage.

Accommodating two rolling-contact elements in pairs in each pocket of the cage gives a bearing with a high bearing capacity since the number of webs is reduced while the chosen width of the webs can simultaneously be correspondingly small, owing to the method of production. Moreover, effective form-fitting retention of the rolling-contact elements in the cage pockets is achieved by means of the stub-shaped webs. A cage of this kind configured in accordance with the invention is distinguished by a particularly low weight without sacrificing sturdiness and is suitable, in particular, for bearings with high speeds of revolution. In addition, a cage of this kind can be produced at very low cost. It is furthermore advantageous that cages according to the invention can be produced in different sizes without difficulty, owing to the method of production. The profiled strip merely has to be cut to length in accordance with the desired cage diameter. The absence of contact between the stub-shaped webs and the rolling-contact elements during operation of the bearing on the one hand provides a low-friction bearing while, on the other hand, the stub-shaped webs ensure form-fitting retention of the rolling-contact elements during transportation and assembly.

Advantageous embodiments of the invention are described in subclaims 2 to 7.

Provision is made for the rolling-contact elements to be held on the inside and the outside, a roller ring comprising the cage and the rolling-contact elements thus being formed.

According to another feature, the rolling-contact elements are to be held by the cage only on the inside or the outside, while an outer or an inner ring is used to retain the rolling-contact elements on the opposite side.

According to another feature, the cage is to have a W- or A-shaped configuration, the webs of which are formed, adjoining the side rings, by sections that extend in parallel, lie inside the pitch circle and are continued by two sections that extend obliquely to the cage axis and combine to form a section that extends in parallel and lies outside the pitch circle, the stub-shaped webs being arranged so as to lie inside the pitch circle.

According to another feature, the cage has an M- or V-shaped configuration, the webs of which are formed, adjoining the side rings, by sections that extend in parallel, lie outside the pitch circle and are continued by two sections that extend obliquely to the cage axis and combine to form a section that extends in parallel and lies inside the pitch circle, the stub-shaped webs being arranged so as to lie outside the pitch circle.

According to another feature of the invention, provision is made for the thickness of the cage material used to be less than or equal to 30% of the diameter of the rolling-contact elements.

Finally, in another variant of the cage provision is made for it to have an M- or V-shaped configuration, the webs of which are formed, adjoining the side rings, by sections that extend in parallel, lie outside the pitch circle and are continued by two sections that extend obliquely to the cage axis and combine to form a section that extends in parallel and lies inside the pitch circle, the stub-shaped webs being arranged so as to lie inside the pitch circle and starting from a projection that points radially inward and branches off from the side rings.

The invention is explained in greater detail with reference to exemplary embodiments below.

DETAILED DESCRIPTION OF THE DRAWINGS

Figure 1:
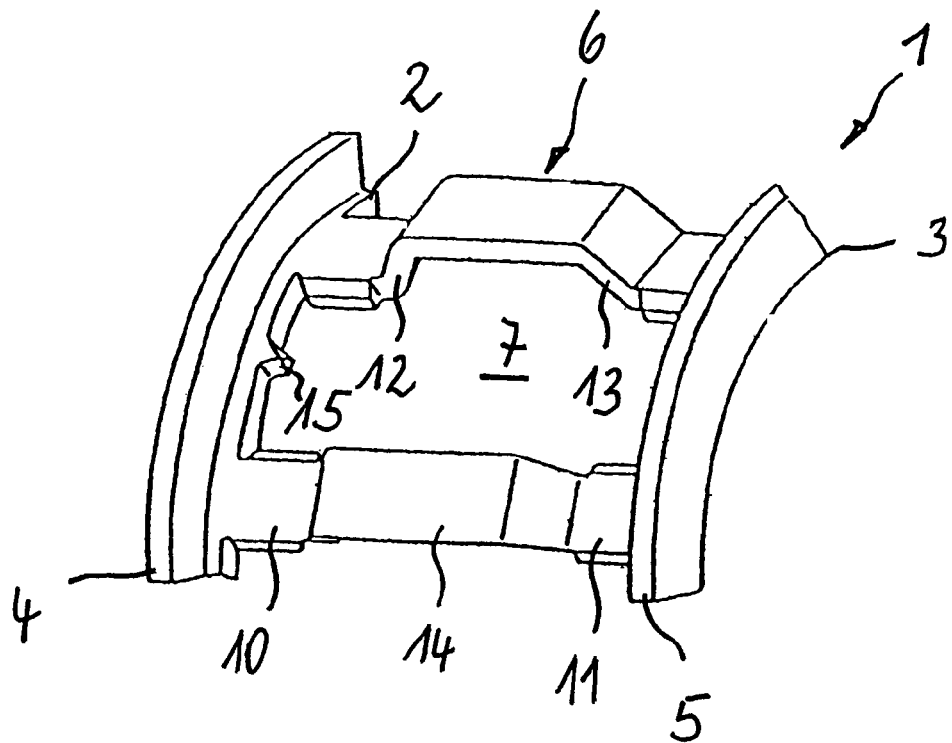
FIG. 1 shows a fragment of a perspective representation of a cage according to the invention.
Figure 2:
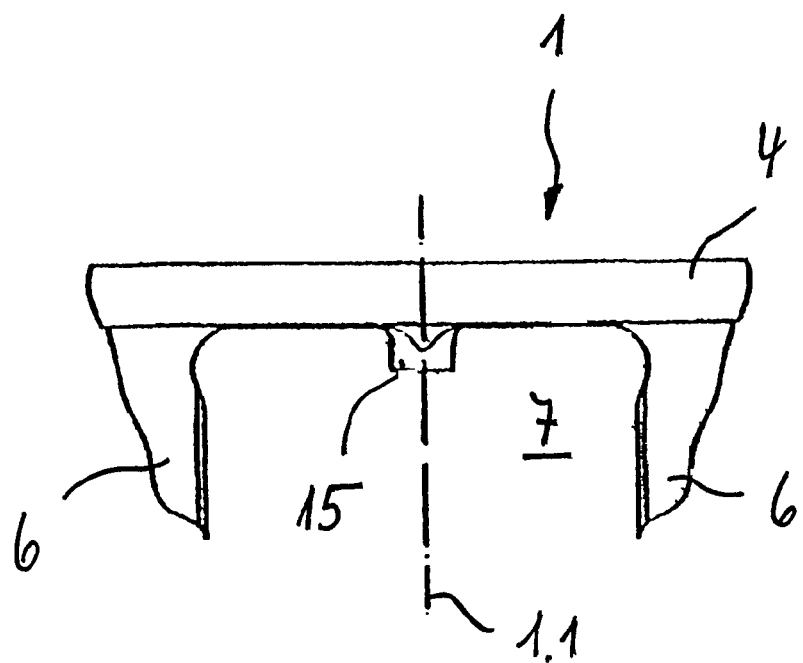
FIG. 2 shows a fragment of a radial plan view of the cage shown in FIG. 1, FIGS. 3 and 4 show a cross section through the cage shown in FIG. 1 with and without cylindrical rollers.
Figure 3:
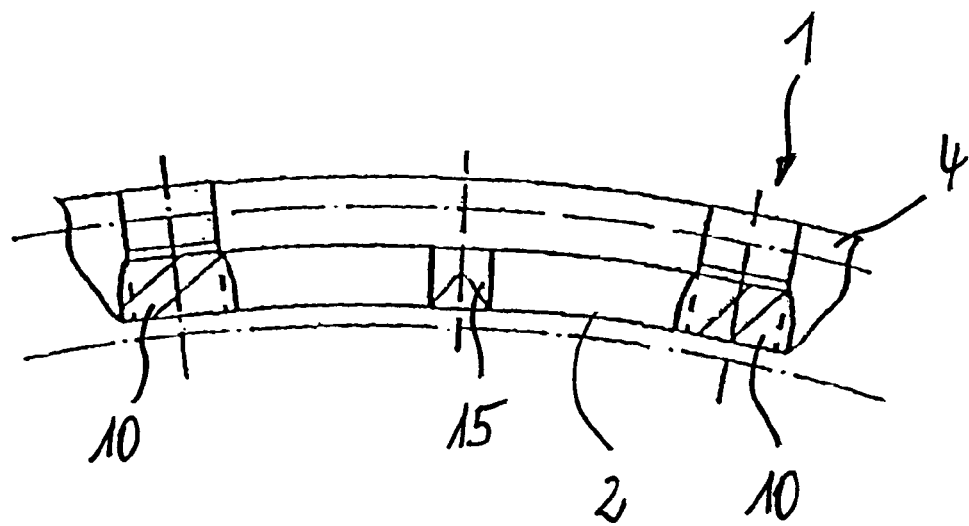
Figure 4:
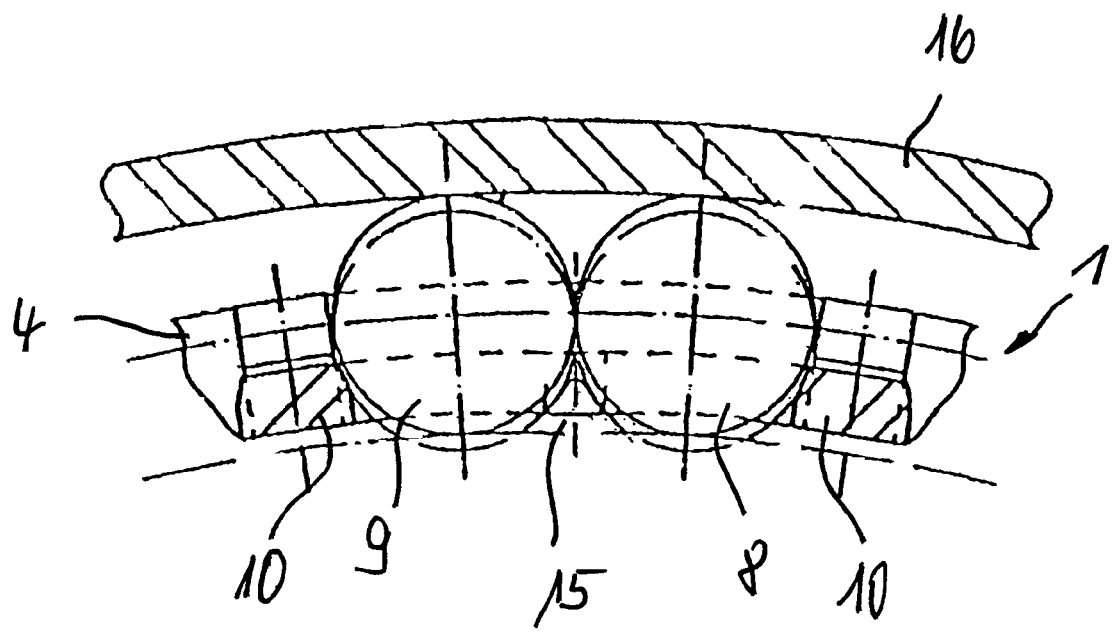
Figure 5:
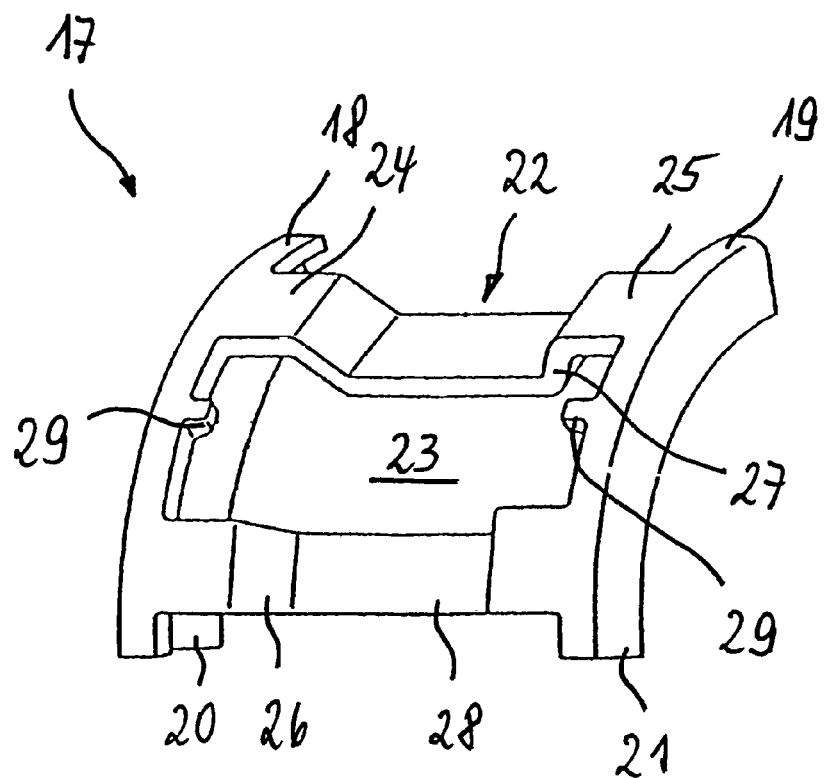
FIG. 5 shows a fragment of a perspective representation of a cage according to the invention
Figure 6:
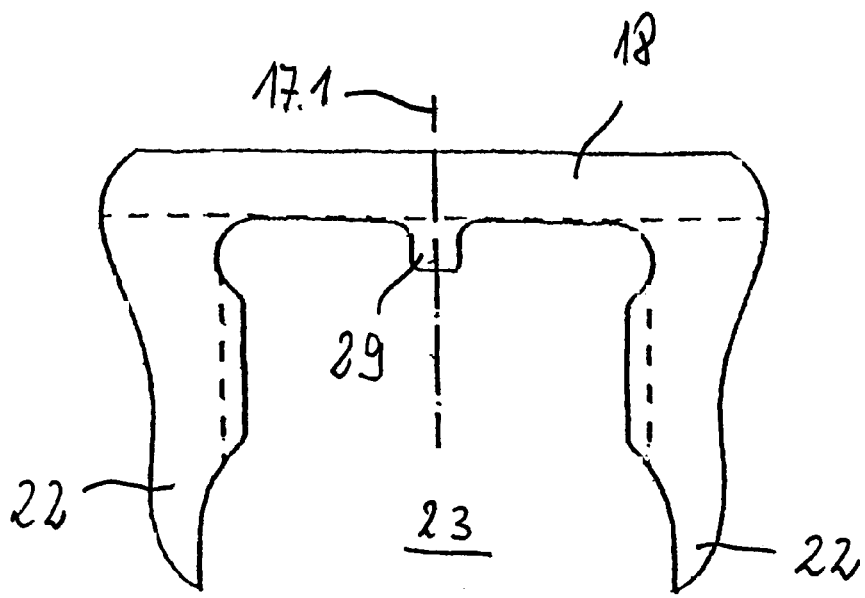
FIG. 6 shows a fragment of a radial plan view of the cage shown in FIG. 5, FIGS. 7 and 8 show a cross section through the cage shown in FIG. 5 with and without cylindrical rollers.
Figure 7:
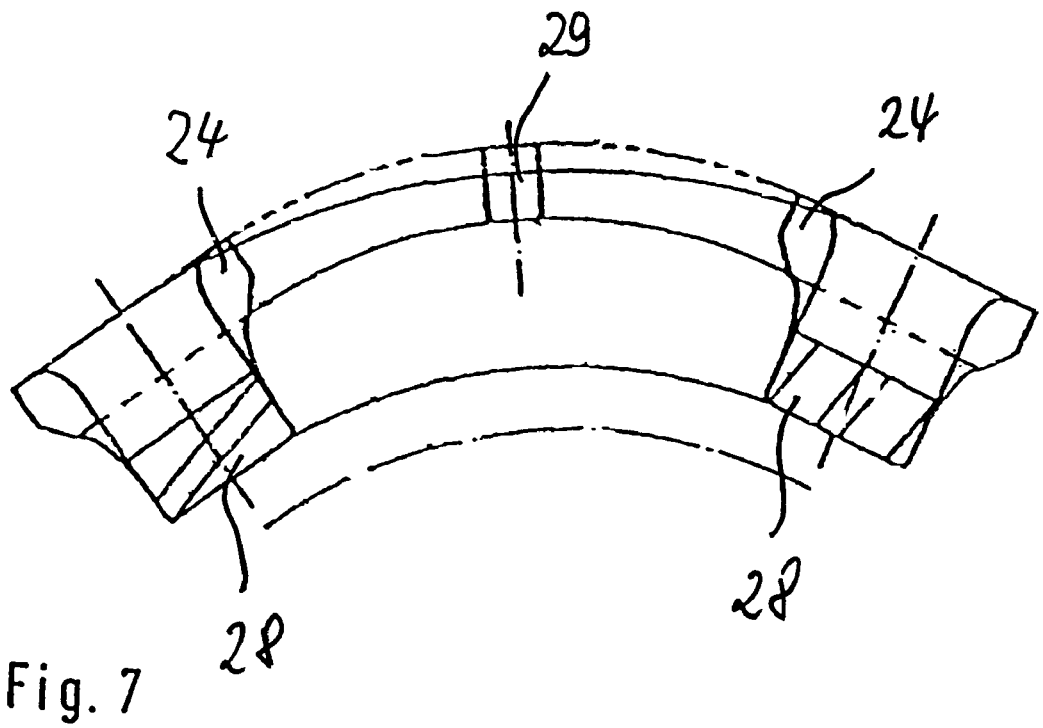
Figure 8:
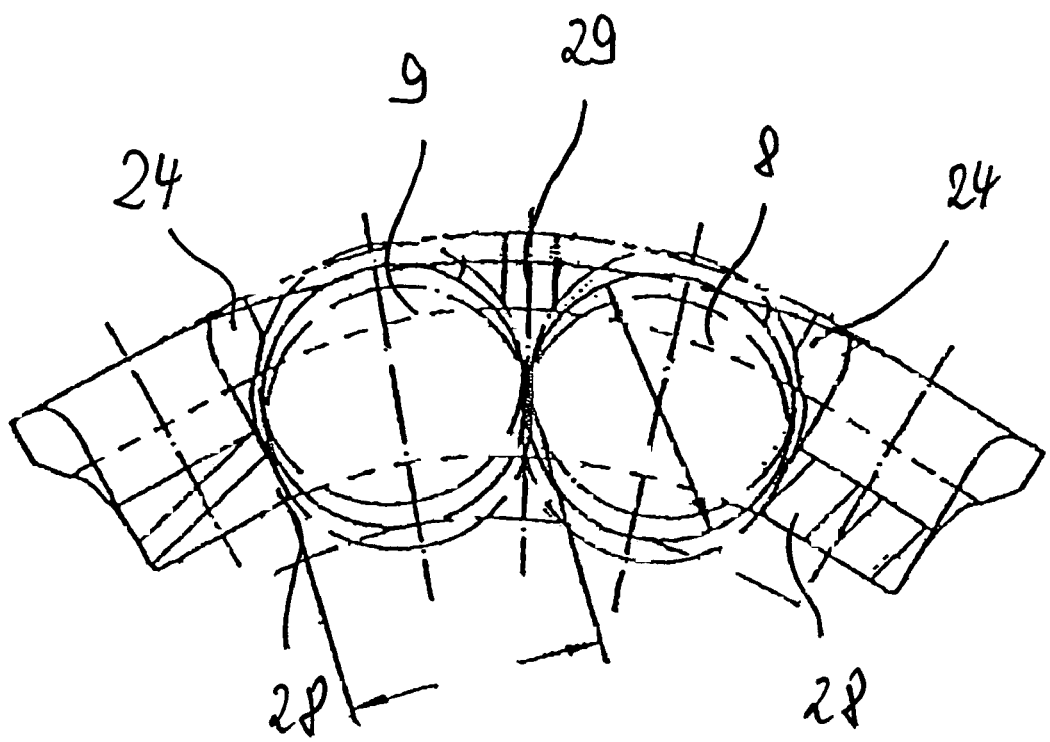

The W-shaped cage 1 illustrated in FIGS. 1 to 4 comprises the side rings 2, 3, which are provided with rims 4, 5 that face radially outward. The side rings 2, 3 are connected to one another by a number of profiled webs 6, which are arranged in a uniformly distributed manner around the circumference, with the result that pockets 7 to accommodate two rolling-contact elements 8, 9 are formed. The pockets 7 thus formed are bounded, on the one hand, by the side rings 2, 3 and, on the other hand, by the profiled webs 6. These webs are offset outward in the radial direction over the pitch-circle radius of the rolling-contact elements and comprise two sections 10, 11, which adjoin the side rings 2, 3 and extend parallel to the cage axis 1.1. The sections 10, 11 lie inside the pitch circle and merge into respective sections 12, 13, which are aligned obliquely to the cage axis 1.1 and which, in turn, combine to form a section 14 extending parallel to the cage axis 1.1 and outside the pitch circle.

As the figures mentioned also show, there are stub-shaped webs 15 arranged on the side rings 2, 3 on both sides, in the center of the pocket 7, said stub-shaped webs projecting partially into the pockets 7 in the axial direction. The distance in the circumferential direction from the stub-shaped webs 15 to the edge of the web section 10, 11 is slightly less than the diameter of the two rolling-contact elements 8, 9 arranged in pairs in the pocket 7, thus preventing said elements from falling inward out of the pocket 7 in the radial direction. In the exemplary embodiment under consideration, the external retention means for the two rolling-contact elements 8, 9 is formed by the associated outer bearing ring 16. From FIG. 4, it can furthermore be seen that no contact occurs between the stub-shaped web 15 and the two rolling-contact elements 8, 9 when the bearing rotates. In this case, these elements rub against one another with their lateral surfaces.

The M-shaped cage 17 shown in FIGS. 5, 6, 7 and 8 comprises the side rings 18, 19, which are provided with rims 20, 21 that face radially inward. The side rings 18, 19 are connected to one another by a number of profiled webs 22, which are arranged in a uniformly distributed manner around the circumference, with the result that pockets 23 to accommodate the rolling-contact elements 8, 9, which are arranged in pairs, are formed. The pockets 23 thus formed are bounded, on the one hand, by the side rings 18, 19 and, on the other hand, by the webs 22. These webs are offset in the direction of the center of the bearing over the pitch-circle radius of the rolling-contact elements and comprise two sections 24, 25, which adjoin the side rings 18, 19 and extend parallel to the cage axis 17.1. These sections 24, 25 lie outside the pitch circle and merge into respective sections 26, 27, which are aligned obliquely to the cage axis 17.1 and which, in turn, combine to form a section 28 extending parallel to the cage axis 17.1 and inside the pitch circle.

As the figures mentioned also show, the side rings 18, 19 are provided in the center of the pocket 23 with stub-shaped shaped webs 29, which point axially into said pocket and divide the pocket 23 into two component zones for accommodating the two rolling-contact elements 8, 9. The cage 17 has both an outer and an inner retention means, a roller ring comprising the cage 17 and the accommodated cylindrical rollers 8, 9 thus being formed. The outer retention means is formed by the stub-shaped webs 29 and the abutment edge of the web sections 24, 25, the circumferential spacing between which is slightly less than the diameter of the rolling-contact elements 8, 9. These stub-shaped webs 29 are arranged radially at the outside on the side rings 18, 19. The inner retention means is formed by the web section 28 situated inside the pitch circle, the edge spacing between which in the circumferential direction must be slightly less than twice the diameter of the two rolling-contact elements 8, 9 arranged in pairs in the pocket 23. The cage 17 is filled with the two rolling-contact elements 8, 9 by a procedure in which rolling-contact element 8 is inserted into the pocket 23 first. During this process, said element is pushed outward in the radial direction until it comes to rest between the stub-shaped webs 29 and the edge of the web section 24, 25. The remaining, left-hand half of the pocket is defined by the distance in the circumferential direction between the lateral surface of the rolling-contact element 8 and web section 28. The second rolling-contact element 9 is now likewise pushed radially into the pocket 23 from the inside and snaps in between the web 22 or its section 28 and the first rolling-contact element 8. The two rolling-contact elements 8, 9 can thus move and roll unhindered during operation of the bearing, but are held in the cage 17 by inner and outer retention means, the stub-shaped webs 29 once again having no contact with the two rolling-contact elements 8, 9 during operation of the bearing.

Figure 9:
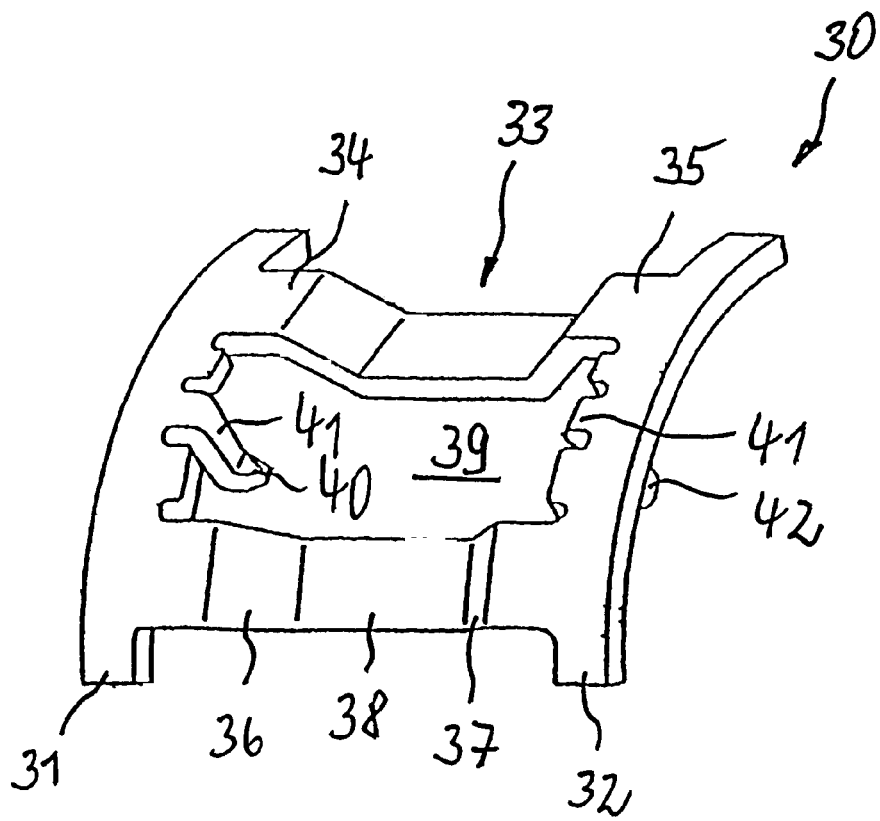
FIG. 9 shows a fragment of a perspective representation of a cage according to the invention.
Figure 10:
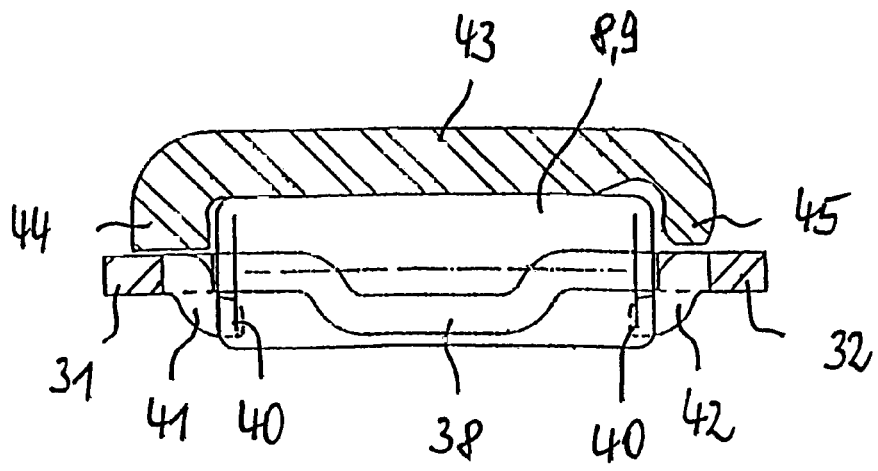
FIG. 10 shows an axial section through a bearing with a cage in accordance with FIG. 9.

FIGS. 9 and 10 show a V-shaped cage 30, the two side rings 31, 32 of which are connected to one another by profiled webs 33, pockets 39 to accommodate the rolling-contact elements 8, 9 thus being formed. The cage 30 again has web sections 34, 35 that extend parallel to the cage axis 30.1 and directly adjoin the two side rings 31, 32. The web sections 34, 35 merge into the two sections 36, 37, which extend obliquely to the cage axis 30.1 and again combine to form the web section 38, which extends parallel to the cage axis 30.1 and lies inside the pitch circle. Arranged on both sides in the center of the pocket 39 are stub-shaped webs 40, which start from a projection 41, 42, which points radially inward and again has its origin in the side rings 31, 32. In this way, an inner retention means is formed, which prevents the rolling-contact elements 8, 9 from falling out radially. The outer retention means is provided by the outer ring 43 illustrated in FIG. 10, which is formed without cutting and is configured with radially inward-facing rims 44 and 45 on both sides.

The invention claimed is:

1. A cage for cylindrical rolling-contact elements comprising webs, wherein the webs comprise sections that extend parallel to the cage axis, lie partially inside and partially outside a pitch circle formed by the cylindrical rolling-contact elements and are connected to one another by sections that extend obliquely to the cage axis, and two side rings, the webs connecting the side rings to one another, the side rings and the webs forming at least one pocket, two cylindrical rolling-contact elements in contact with one another at their lateral surfaces being arranged in series in a circumferential direction in each of said at least one pocket, each of the two rolling-contact elements being guided parallel to a cage axis by the webs, the side rings having stub-shaped webs in the center of the pockets, each stub-shaped web projecting partially into a pocket between the two rolling-contact elements, the cage being rolled into a round shape from a profiled sheet-metal strip, the ends of which are connected to one another after it has been bent into a round shape, and the stub-shaped webs being dimensioned and located such that the stub-shaped webs have no contact with the rolling-contact elements during rotation of the cage.

2. The cage (17) as claimed in claim 1, wherein the rolling-contact elements (8, 9) are held on the inside and the outside, a roller ring comprising the cage (17) and the rolling-contact elements (8, 9) thus being formed.

3. The cage as claimed in claim 1, wherein the rolling-contact elements are held by the cage only on the inside or the outside, while an outer or an inner ring is used to retain the rolling-contact elements on the opposite side.

4. The cage as claimed in claim 1, wherein the cage has a W- or A-shaped configuration, the webs of which are formed, adjoining the side rings, by sections that extend in parallel, lie inside the pitch circle and are continued by two sections that extend obliquely to the cage axis and combine to form a section that extends in parallel and lies outside the pitch circle, the stub-shaped webs being arranged so as to lie inside the pitch circle.

5. The cage (17) as claimed in claim 1, wherein it has an M- or V-shaped configuration, the webs (22) of which are formed, adjoining the side rings (18, 19), by sections (24, 25) that extend in parallel, lie outside the pitch circle and are continued by two sections (26, 27) that extend obliquely to the cage axis (17.1) and combine to form a section (28) that extends in parallel and lies inside the pitch circle, the stub-shaped webs (29) being arranged so as to lie outside the pitch circle.

6. The cage as claimed in claim 1, wherein the thickness of the cage material used is less than or equal to 30% of the diameter of the rolling-contact elements.

7. The cage (30) as claimed in claim 1, wherein it has an M- or V-shaped configuration, the webs (33) of which are formed, adjoining the side rings (31, 32), by sections (34, 35) that extend in parallel, lie outside the pitch circle and are continued by two sections (36, 37) that extend obliquely to the cage axis (30.1) and combine to form a section (38) that extends in parallel and lies inside the pitch circle, the stub-shaped webs (40) being arranged so as to lie inside the pitch circle and starting from a projection (41, 42) that points radially inward and branches off from the side rings (31, 32).

* * * * *